Oct. 22, 1968  W. B. GOGARTY  3,406,754
PETROLEUM PRODUCTION UTILIZING MISCIBLE-TYPE
AND THICKENED SLUGS
Filed June 19, 1967

*INVENTOR.*

WILLIAM B. GOGARTY

BY *Jack L. Hummel*

United States Patent Office 3,406,754
Patented Oct. 22, 1968

3,406,754
PETROLEUM PRODUCTION UTILIZING MISCIBLE-TYPE AND THICKENED SLUGS
William B. Gogarty, Littleton, Colo., assignor to Marathon Oil Company, Findlay, Ohio, a corporation of Ohio
Continuation-in-part of application Ser. No. 283,498, May 27, 1963. This application June 19, 1967, Ser. No. 646,811
14 Claims. (Cl. 166—9)

ABSTRACT OF THE DISCLOSURE

This invention relates to a process for recovering fluid hydrocarbons from fluid petroleum-bearing subterranean formations having drilled therein at least one each of a production means and an injection means comprising
(a) injecting into the subterranean formation at least one slug of a soluble oil,
(b) injecting into said formation at least one slug of a thickened fluid drive material differing from said soluble oil to displace the fluid hydrocarbon toward at least one production means and
(c) recovering oil from said formation.

CROSS REFERENCES TO RELATED APPLICATIONS

Figure 1:
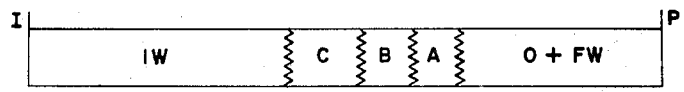

This application is a continuation-in-part of my copending United States patent applications Ser. No. 283,498, filed May 27, 1963, now abandoned, and United States patent application Ser. No. 544,953, filed Apr. 25, 1966.

BACKGROUND OF THE INVENTION

Soluble oil types of micellar dispersions are used as the oil displacing fluid in a secondary type oil recovery process. The soluble oil is displaced through the formation by a drive material of controlled viscosity, for example, aqueous or hydrocarbon solutions containing polymers. Examples of soluble oils are found in United States Patent No. 3,254,714.

This invention relates to the use of thickened drive fluids in oil recovery and more particularly to a process wherein a slug of soluble oil is injected into a formation and subsequently a slug of thickened fluid is injected into the formation.

Oil can be produced by injecting soluble oils into subterranean formations. The initially injected slug of crude-compatible soluble oil is sometimes followed by a slug of water-external emulsion which is compatible with the drive fluid. Finally, water has been used to drive materials through the formation.

SUMMARY OF THE INVENTION

I have now discovered that the drive fluid compatible material required in the above processes can be reduced in size or eliminated by driving the soluble oil slug(s) with a thickened drive fluid of controlled mobility. This technique retains the excellent properties of the soluble oil flood. Soluble oils, as used herein, include the compositions commonly known as "microemulsions," "transparent emulsions," "fine emulsions," "micellar solutions," "micellar dispersions," etc. Essentially, they are substantially clear, stable dispersions of a polar fluid, such as water, in a nonpolar medium, such as a hydrocarbon. The equilibrium of these systems is toward further dispersion of the internal phase rather than toward coalescence of this phase. (Cores taken from areas of subterranean formations swept by a soluble oil flood followed by thickened water have been found to be as clean of oil as though cleaned by laboratory techniques.)

Prior to describing my invention in detail, a brief review of the requirements for an efficient flood might be helpful. The efficiency of an oil recovery process is determined by the amount of oil in the formation at the time flooding is initiated. To have a good efficiency, the flooding media should have a mobility, at least at its leading edge less than that of the crude oil being displaced and should preferentially displace the oil from the formation. Water is preferred, economically, as a major portion of the drive material. Water has a low viscosity; therefore, to obtain maximum efficiency, the mobility of the displacing material is preferably increased gradually from its low at the oil interface to that of the primary drive material.

The figures of the attached drawing illustrate various recovering techniques utilizing soluble oil slugs. FIGURES 1-7 disclose various procedures coming within the scope of this invention. The letter designations are the same for all figures.

I represents an injection well and P, a producing well. The sequence of FIG. 1 represents the preferred soluble oil flood described above. In FIG. 1, O and FW represent oil and formation water, respectively. IW is injected water; and slugs A, B, and C represent soluble oil, water-external emulsion, and a water-external emulsion having an incremental viscosity reduction from that of slug B to that of IW, respectively. In use, O and FW are recovered from the formation through well P after injection of slug A; followed, in order, by injection of slugs B and C; and finally IW through well I.

Figure 2:
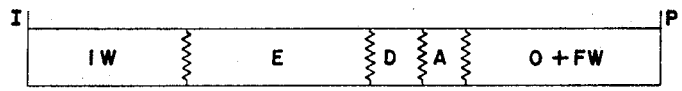

In the process of FIG. 2, slug A has been reduced in volume and slugs B and C of FIG. 1 have been replaced by slug D (a thickened flood material) and slug E (a water-miscible thickened flood material). Slug E can have incremental viscosity reduction from a viscosity about that of slug A to that of IW.

Figure 3:

In the process of FIG. 3, slug A has been further reduced and the incremental reduction in viscosity accomplished with a much larger slug E.

Figure 4:
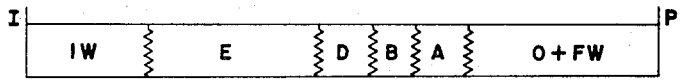

In the process of FIG. 4, slugs A, B and D are driven by a smaller slug E. This process provides three slugs—A, B and D—of approximately equal viscosity. This configuration provides a very stable front having little fingering or channeling.

Figure 5:
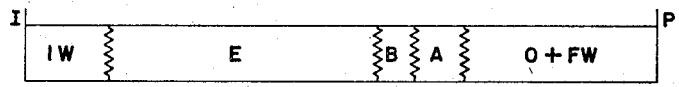

In the process of FIG. 5, slug D of FIG. 4 has been omitted and slug E enlarged to provide a more gradual viscosity gradient.

Figure 6:
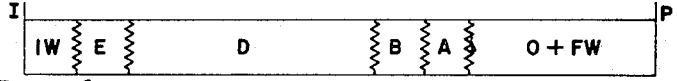

The process represented by FIG. 6 is essentially that of FIG. 4, although slug D has been increased appreciably to provide a highly stable frontal movement.

Figure 7:
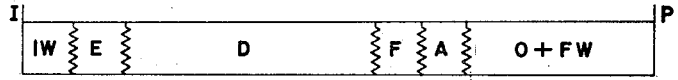

In the process of FIG. 7, slug F (an oil-miscible thickened flood material) has been substituted for slug B of FIG. 6.

Other variations of my process are obvious, and it is intended that they be included within the scope of my invention as claimed. For example, in the process of FIG. 3, an oil-miscible thickened slug, having an incrementally reduced viscosity from front to rear, can be substituted for E and a hydrocarbon gas drive substituted for IW.

As mentioned previously, the first slug injected into the subterranean formation is an oil compatible, soluble oil. The soluble oil is, preferably, composed of a mixture of crude petroleum liquids and gases, or fractions thereof; water; and a surfactant. A cosolvent, such as a water-soluble alcohol, can be added if needed. A preferred mixture contains, by volume, from about 30 to about 85% crude petroleum liquids or gases, or a lower aliphatic hydrocarbon fraction thereof; from about 5 to about 50% water; from about 2 to about 5% of a lower aliphatic alcohol; and at least about 8% of a surfactant.

Petroleum constituents of the soluble oils include petroleum crudes; for example, a sweet crude from the Illinois Basin, kerosene, straight run gasoline, propane, and pentane.

Alcohols used in making the soluble oils are alcohols containing up to about 8 carbon atoms, such as methanol, propanol, isopropanol, amyl alcohol, isobutanol, tertiary butyl alcohol, ethylene glycol, cyclohexanol, cresol, phenol, and glycerin. The secondary lower aliphatic alcohols, particularly isopropanol, are the preferred alcohols for use in the soluble oils. Other cosolvents include the esters, amides, ketones, etc., having polarities about that of the lower molecular weight alcohols.

Surfactants which can be used include the various nonionic, cationic, and anionic surfactants. Examples of such surfactants include sodium glyceryl monolaurate sulfate, dihexyl sodium succinate, hexadecylnaphthalene sulfonate, diethyleneglycol sulfate, glycerol disulfoacetate monomyristate, p-toluidene sulfate laurate, p-chloroaniline sulfate laurate, sodium sulfato oleylethylanilide, triethanolamine myristate, N-methyltaurine oleamide, pentaerythritol monostearate, polyglycerol monolaurate, triethanolamine oleate, morpholine stearate, hexadecyl trimethylammonium chloride, ditetradecyl dimethyl ammonium chloride, n-dodecyldiethylene glycol sulfate, monobutylphenyl phenol sodium sulfate, and triethanolamine laurate or triethanolamine oleate.

Anionic surfactants, such as higher alkylaryl monosulfonates, particularly alkylnaphthenic monosulfonates having an empirical formula approximately $$C_nH_{2n-10}SO_3Na$$

wherein $n=25$ to 30 and the alkyl radical contains from about 10 to 20 carbon atoms, are preferred. The sodium salts of dialkylsuccinates are also particularly desirable for use in making up bank materials. It is preferred that the alkyl radicals of the succinate compounds contain from about 6 to about 10 carbon atoms.

The type of surfactant utilized depends upon the temperature of the formation and the hardness, including salinity, and pH of the connate water and the water used to make up the bank material. It would be futile to use a detergent such as sodium oleate in a formation containing relatively high concentrations of calcium and magnesium ions, as the precipitated calcium and magnesium soaps would plug the formation. Similarly, where there is a natural detergent in the crude, a surfactant having a similar ionic charge must be used to avoid precipitating an insoluble reaction product.

Water used in preparing the soluble oils is preferably brackish. An example of an oil-external soluble oil is comprised of 24%, by volume, water; 61.1% straight run gasoline; 11.1% alkylnaphthenic monosulfonate having an empirical formula approximately $C_nH_{2n-10}SO_3Na$, with $n=25$ to 30; and 3.8% isopropanol.

While the above oil-compatible slug is a preferred formulation, other surfactants and petroleum fraction can be utilized in making up the slugs according to well-known formulation techniques.

The oil-external slug can be followed by a water-external slug. A preferred water-external slug is composed of 60% water, 32.2% straight run gasoline, 5.8% sulfonate surfactant, and 2% isopropanol.

Thickened drive fluid materials which can be utilized in the process of this invention are legion. For example, sugars, dextrans, carboxymethyl cellulose, amines, polymers, glycerin, alcohols, and mixtures of these agents have been suggested for use in thickened water floods. Thickened hydrocarbon drive fluids known to the art include polyisobutylene or rubber in benzene. Desired viscosities are determined readily by gradually increasing the amount of a particular thickening agent added to a known volume of drive fluids until a desired viscosity is obtained.

A thickened water flood of particular utility utilizes up to 1% of polyacrylic acid having molecular weight in the range of about 250,000. Viscosities in excess of 3.5 cp. are achieved at the 1.0% level.

The most preferred thickening material is a partially hydrolyzed polyacrylamide. These materials are presently sold under the trade name "Pusher" by the Dow Chemical Company.

As is evident from a perusal of FIGS. 1–7, quite a variety of combinations of soluble oil and thickened slugs can be utilized in my process. Normally, from about 3 to more than 5% of the formation pore volume of soluble oil is necessary to effect good oil recoveries. Preferably, 3–10% by volume soluble oil is used. The amount of soluble oil required varies with the acreage to be flooded. Volumes of 2.5 to 5.0% are adequate to flood a 40–50 acre area, while 5–10% volumes are necessary for a 3–5 acre area.

Total soluble oil and drive fluid volumes may range as high as 100% of pore volume or greater and may range to less than 50% of pore volume.

The following examples more fully illustrate my invention; but it is not intended that the invention be limited to the soluble oils; drive fluids, well depth, percentages of composition, etc., shown. Rather, it is intended that all equivalents obvious to those skilled in the art be included within the scope of my invention as claimed.

EXAMPLE I

A slug, comprising 8% of the pore volume of a formation, of oil-external soluble oil is injected into the external wells of a five-spot pattern drilled into a 10-foot thick sand located at a depth of 950 feet. The oil-external soluble oil is composed of 24%, by volume, water; 61.1% straight run gasoline; 11.1% of a refined alkylnaphthenic monosulfonate purchased from Shell Chemical Company; and 3.8% isopropanol. Well spacing is 2.5 acres. The sand in the formation has a permeability of 150 md. and a porosity of 19–21%. The initial oil saturation of the formation is 50–55%, and water saturation is 23–27%. Gas and voids account for 18–27% of the pore volume. Crude viscosity is about 11.5 cp. at 21° C.

The oil-external slug is followed by a water-external emulsion, in an amount equivalent to about 3% of the pore volume, having the composition 60.0%, by volume, water; 32.2% straight run gasoline; 5.8% alkylnaphthenic monosulfonate; and 2.0% isopropanol. The above two slugs have a viscosity approximately equal to that of the crude in the formation.

A slug of thickened water drive material having a viscosity such that the mobility gradually decreases from that of the crude at its leading edge to that of water at its trailing edge is then injected into the formation. About 4.0% of a high molecular weight polyacrylic acid is required for the desired water viscosity control. The flood is continued with water at an injection rate of 30–60 bbls./day.

EXAMPLE II

A slug, comprising 10% of the pore volume of a formation, of oil-external soluble oil was injected into the center well of a three acre five-spot pattern drilled into a 10-foot thick sand located at a depth of about 1000 feet. The oil-external soluble oil is composed of 31.0%, by volume, water; 56.0% hydrocarbon; 10.4% of an alkylnaphthenic monosulfonate; 1.7% isopropanol; 0.1% nonylphenol; and, based on the weight of the water phase, 0.93% NaOH. The initial oil saturation of the formation is 35–50%, and water saturation is 50–65%. Crude viscosity is about 8 cp. at 21° C.

A thickened water drive material having a viscosity such that the mobility is equal to that of the formation fluids was then injected into the formation. About 50% of pore volume thickened drive material, having about 1250 p.p.m. of a high molecular weight partially hydrolyzed polyacrylamide and small amounts of sodium hydroxide is being injected having a constant mobility. Over 5% of additional drive fluid having a tapered viscosity will then be injected. Finally, the flood will be continued with water until the flood is complete.

Now having described my invention, what I claim is:

1. The process for recovering fluid hydrocarbons from fluid petroleum-bearing subterranean formations having drilled therein at least one each of a production means and an injection means comprising:
   (a) injecting into the subterranean formation at least one slug of a soluble oil,
   (b) injecting into said formation at least one slug of a thickened fluid drive material differing from said soluble oil to displace the fluid hydrocarbon toward at least one production means and
   (c) recovering oil from said formation.

2. The process of claim 1 wherein the said at least one thickened drive fluid has at least a portion of said flood material which is incrementally increased in mobility from about that of the soluble oil slug at the leading edge of the material to about that of a non-thickened drive material at the juncture between the thickened flood material and said non-thickened drive material.

3. The process of claim 1 wherein the total volume of soluble oil injected is at least 2% of the pore volume of the formation from which oil is recovered.

4. The process for recovering hydrocarbons from subterranean fluid petroleum-bearing formations having drilled therein at least one each of a production means and an injection means comprising
   (a) injecting into the subterranean formation at least one slug of soluble oil,
   (b) injecting into the formation thickened water fluid drive material differing from said soluble oil to drive hydrocarbons toward at least one production means, and
   (c) recovering oil from said formation through said at least one recovery means spaced apart from said injection means.

5. The process of claim 4 wherein at least a portion of said thickened flood material is incrementally increased in mobility from about that of the soluble oil to about that of water.

6. The process of claim 4 wherein the volume of soluble oil injected into the formation comprises from about 3 to about 10% of the pore volume of the formation from which oil is recovered.

7. The process for recovering hydrocarbon from hydrocarbon-containing subterranean formations comprising
   (a) injecting into a subterranean formation, through at least one injection means drilled therein, a soluble oil comprising a liquid hydrocarbon selected from a group consisting of petroleum hydrocarbons and fractions thereof, water, and at least one soluble oil-forming surfactant;
   (b) injecting into the formation thickened water flood material differing from said soluble oil;
   (c) injecting water into the formation to drive hydrocarbon toward at least one recovery means spaced apart from said injection means; and
   (d) recovering oil from said formation through at least one production means drilled into said formation.

8. The process of claim 7 wherein at least a portion of said thickened water flood material is incrementally increased in mobility from about that of the soluble oil to about that of water.

9. The process of claim 7 wherein a slug of a water-external emulsion having a viscosity of about that of the soluble oil is injected into the formation through at least one injection well after injection of the soluble oil and prior to injection of the thickened water flood material.

10. The process of claim 9 wherein a substantial portion of the thickened water flood material has substantially the viscosity of the soluble oil.

11. The process for recovering hydrocarbon from hydrocarbon-containing subterranean formations having at least one each injection and production means drilled therein comprising
   (a) injecting into an oil-bearing subterranean formation a slug of water-containing soluble oil having a viscosity at least substantially that of the fluids in the formation,
   (b) injecting into said formation at least one thickened flood material,
   (c) injecting a drive fluid into the formation, and
   (d) recovering oil from said formation.

12. The process of claim 11 wherein at least a portion of said thickened flood material is incrementally increased in viscosity from about that of the soluble oil slug at the leading edge of the material to about that of a drive material at the juncture between the thickened flood material and the drive material.

13. The process of claim 11 in which the thickened flood material is oil miscible and the drive material is a hydrocarbon.

14. The process of claim 11 wherein the thickened flood material is thickened water fluid drive material and the drive fluid is water.

References Cited

UNITED STATES PATENTS

| | | | |
|---|---|---|---|
| 2,771,138 | 11/1956 | Beeson | 166—9 |
| 2,867,277 | 1/1959 | Weinang et al. | 166—9 |
| 3,053,765 | 9/1962 | Sparks | 166—9 X |
| 3,163,214 | 12/1964 | Csaszar | 166—9 |
| 3,167,118 | 1/1965 | Habermann | 166—9 |
| 3,208,517 | 9/1965 | Binder et al. | 166—9 |

OTHER REFERENCES

Slobod et al.: "Use of a Graded Viscosity Zone to Reduce Fingering in Miscible Phase Displacements," Producers monthly, August, 1960, (pp. 12, 14–16, 18 and 19).

STEPHEN J. NOVOSAD, *Primary Examiner.*